United States Patent
Takahashi et al.

(10) Patent No.: US 7,249,869 B2
(45) Date of Patent: Jul. 31, 2007

(54) LIGHT EMITTING DEVICE

(75) Inventors: Toshinori Takahashi, Aichi (JP); Akihiro Misawa, Aichi (JP); Yoshiharu Tanaka, Aichi (JP)

(73) Assignee: Toyoda Gosei Co., Ltd., Nishikasugai-gun, Aichi (JP)

( * ) Notice: Subject to any disclaimer, the term of this patent is extended or adjusted under 35 U.S.C. 154(b) by 25 days.

(21) Appl. No.: 11/191,997

(22) Filed: Jul. 29, 2005

(65) Prior Publication Data

US 2006/0023468 A1 Feb. 2, 2006

(30) Foreign Application Priority Data

Jul. 30, 2004 (JP) .......................... P2004-224809
Jul. 30, 2004 (JP) .......................... P2004-224813

(51) Int. Cl.
*F21V 7/00* (2006.01)

(52) U.S. Cl. ........................................ 362/300; 362/619

(58) Field of Classification Search ................ 362/300, 362/307, 311, 612, 617–619
See application file for complete search history.

(56) References Cited

U.S. PATENT DOCUMENTS 5,249,104 A * 9/1993 Mizobe .................... 362/605
6,889,456 B2 * 5/2005 Shibata et al. ............. 40/546
2002/0034070 A1 * 3/2002 Kumagai .................... 362/26
2003/0128537 A1 * 7/2003 Dorundo et al. ........... 362/29
2004/0004827 A1 * 1/2004 Guest ....................... 362/31

FOREIGN PATENT DOCUMENTS

JP    5-1597      1/1993
JP    9-202178    8/1997

* cited by examiner

*Primary Examiner*—Thomas M. Sember
*Assistant Examiner*—Julie A. Shallenberger
(74) *Attorney, Agent, or Firm*—McGinn IP Law Group, PLLC

(57) ABSTRACT

A light emitting device includes a mark body, a substrate arranged in back of the mark body, an LED mounted on an opposite surface of the substrate to the mark body, and a light guide arranged on a closer side of the substrate to the LED and having an upper surface serving as a light introducing surface for introducing LED-based light, a side surface serving as a light emitting surface and a backside subjected to a light diffuse reflection process to cause diffuse reflection by the backside. Incidentally, there can be provided a light emitting device that includes a light guide arranged on a closer side of the substrate to the LED and having an upper surface serving as a light introducing surface for introducing LED-based light, a side surface serving as a light emitting surface and a backside having a plurality of protrusions in a rib form.

15 Claims, 16 Drawing Sheets

LIGHT EMITTING DEVICE

This application is based on Japanese Patent Applications No. 2004-224809 and 2004-224813, which are incorporated herein by reference.

BACKGROUND OF THE INVENTION

1. Field of the Invention

The present invention relates to a light emitting device for ornamenting a mark with light. The invention is to be applied to an automotive emblem, for example.

2. Description of the Related Art

Conventionally, various contrivances have been made to improve the design and luxuriousness of the exterior appearance of vehicles, etc. Among these, it is a practice to provide light emission on light illuminate light to a mark (emblem) attached on the body at the rear of a vehicle. For example, JP-UM-A-5-1597 and JP-A-9-202178 disclose a structure that a plurality of LEDs are arranged in back of a mark body of light-transmissive material so that LED-based light can be extracted through the mark body thereby causing light emission on the mark.

In the related structure, mark viewability is improved by displaying the mark with light emission in the night. However, because LED-based light as a point light source is directly used in light emission on the mark, the light-emission mode as to the mark includes an extreme high intensity region correspondingly to LED positions. In other words, the light emission mode is based on granularity thus being inferior in design and short of luxuriousness.

Therefore, it is an object of the present invention to provide a structure for providing a mark well in design and high in luxuriousness.

The present invention, for achieving the foregoing object, comprises the following structure. That is, the light emitting device comprises a mark body, a substrate, a first surface of which the mark body is arranged, an LED mounted on a second surface of the substrate, and a light guide arranged on the second surface of the substrate, including a first surface for introducing a light emitted from the LED, a second surface for emitting a light and a third surface opposing the first surface on which a light is reflected in a diffused manner. Incidentally, the third surface of the light guide includes a light diffuse reflection surface.

In the above structure, firstly, LED-based light in the second surface is emitted toward the light guide. The light is introduced into the light guide through the first surface of the light guide and finally emitted at the second surface of the light guide. Here, the third surface of the light guide includes the light diffuse reflection surface, which enhances light diffusion at the inside of the light guide and prevents light from leaking at the third surface. As a result, light is emitted with brightness and reduced in irregular brightness through the second surface of light guide, to indirectly illuminate the mark body from the back thereof. In such an illumination state, it is natural to obtain an effect that visibility of a mark is improved with light while high staging effect is offered. Thus, the mark is superior in design and full in luxuriousness. Meanwhile, because a stereoscopic expression can be felt as if the mark stands out due to the occurrence of light in back of the mark body, unpredictability can be staged in addition to design and luxuriousness superiority.

Meanwhile, the invention is a light emitting device comprising:

a mark body;

a substrate arranged in back of the mark body;

an LED mounted on an opposite surface of the substrate to the mark body;

a light guide arranged on a closer side of the substrate to the LED and having an upper surface serving as a light introducing surface for introducing LED-based light, a side surface serving as a light emitting surface and a backside having a plurality of protrusions in a rib form.

In the above structure, LED-based light is introduced through the upper surface of the light guide and finally extracted from the side surface of the light guide. The major part of the light introduced in the light guide undergoes a reflection effect due to the light guide backside in the course before extraction to the outside. Here, according to the above structure, when the light emitting device is attached to a mount part such as a vehicle body, rib-like protrusions can be utilized that are provided in a backside of the light guide. Namely, the light emitting device can be attached by connecting between the tips of the rib-like projections and the mount part by means of a double-sided tape or an adhesive. In this case, the rib-like projections at tips only are directly involved in the joining wherein the other region of the light guide backside is left in an open state. Accordingly, in this region, there is eliminated light loss or reflection efficiency lowering due to the influence of the joining. In this manner, because of reduced light loss at the backside of the light guide and preferred reflection efficiency as well, excellent light guide effect is presented to improve light utilization efficiency. As a result, bright light emission is available with less irregular brightness through the side surface of light guide, thus indirectly illuminating the mark body from the back thereof. In such an illumination state, it is natural to obtain an effect that mark visibility with light is improved while presenting a high staging effect. Thus, the mark is superior in design and full in luxuriousness. Meanwhile, because a stereoscopic expression can be felt as if the mark stands out due to the occurrence of light in back of the mark body, unpredictability can be staged in addition to design and luxuriousness superiority.

Meanwhile, according to the above structure, the regions involving in connection to the mount part such as a vehicle body exist distributing in a rib form, to enable joining at a high bonding force over a broad area. This makes it possible to firmly fix the light emitting device of the invention to the mount part.

DETAILED DESCRIPTION OF THE PREFERRED EMBODIMENTS

Figure 1:
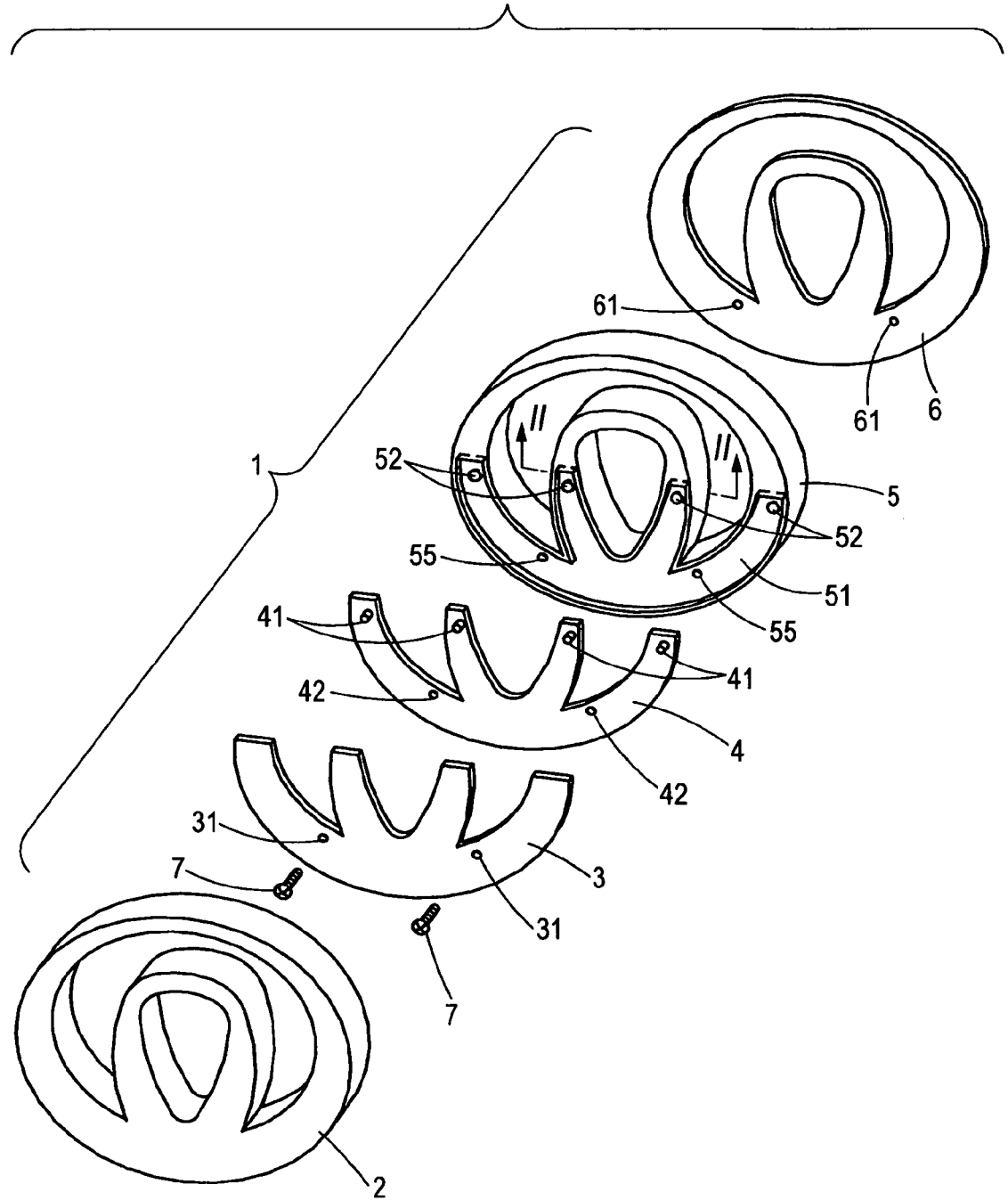
FIG. 1 is an exploded perspective view of a light emitting device 1 in a first embodiment of the present invention.

Now, explanations are made as to the constituent elements of a light emitting device according to the present invention.

(Mark Body)

The light emitting device of the invention is to be applied not only to the emblem for a vehicle but also to the mark to be provided on a PC (personal computer), a cellular phone or the like. Accordingly, there is no limitation in the form of the mark body. For example, it may take a form of a character, a symbol or the like representative of a trademark, such as of a character, a symbol or the like showing the manufacturer of a product the same is applied. The mark can employ a material, for example, of ABS resin, polypropylene resin, polycarbonate resin or the like to which plating has been applied.

(Substrate and LED)

There is arranged a substrate in back of the mark body. The substrate is not especially limited in its form and size provided that not to be seen from an observation side with respect to the mark body. For example, it is possible to employ one analogous in plan form to the mark body and somewhat smaller than the mark body.

In one embodiment of the invention, a cover is used to be arranged between the mark body and the substrate. The cover is used for the purpose of water and/or dust prevention effect for the substrate and light guide, referred later.

In the invention, the substrate surface on an opposite side to the mark body provides a LED-mounted surface. The LED is not especially limited in kind but can employ various kinds including a bullet type, an SMD type, etc. The LEDs for use can be decided in the number and arrangement by taking into consideration mark body form, light quantity required, and so on. Where a plurality of LEDs are used, the LEDs are preferably arranged at a proper interval such that LED-based light is allowed to spread throughout a light guide, referred later, in a range to a possible broad extent. This is because to reduce the irregular brightness in the light emitted. The LEDs can be arranged at a substantially equal interval though depending upon the form of mark body. The LEDs are not especially limited in their color of emission light. It is possible to employ those LEDs that to emit a visible region of light, such as white, red, green, blue or the like, in consideration of mark visibility, ornamental effects and so on.

LED on-off control may be in conjunction with other devices, or may be manual by use of switches. For example, in the case of a mark to be mounted on a vehicle, on-off control for the same may be in conjunction with sidelight on-off control.

(Light Guide)

The light guide is arranged on a closer side of the substrate to the LED thereof. The light guide is not especially limited to in material provided that it has a light transmissivity, i.e. can employ a synthetic resin, such as acryl resin, polyethylene terephthalate (PET), polycarbonate resin, silicone resin or epoxy resin, or a non-organic material such as glass.

The light guide preferably has a form having a plan form thereof analogous to the plan form of the mark body. Because the light guide has a side surface (light emitting surface) extending along the outer periphery of the mark body, uniform light emission along the form of mark body is available in the rear of the mark body. Due to this, the mark body can be observed as if the entire thereof stands out thus exhibiting a high staging effect. More preferably, the light guide has a plan form substantially the same as the plan form of the mark body. Because of forming the light guide with its side surface (light emitting surface) positioned immediately beneath the outer periphery of the mark body, light emission is available bright and uniform along the form of mark body in the rear of the mark body. Due to this, the mark body can be observed as if the entire thereof stands out thus exhibiting a higher staging effect.

The light guide has an upper surface opposed to the LEDs and serving as a light entrance surface where LED-based light is to enter. In the upper surface (light entrance surface) of the light guide, recessed portions are preferably provided in positions corresponding to the LEDs. With this structure, the light guide can be arranged in a manner wrapping around (including) the LEDs. This directs substantially all the part of LED-based light toward the light guide. In this case, a light-transmissive material can be charged between the LED and the light guide. This structure can preferably introduce LED-based light into the light guide. The light-transmissive charge material has preferably a refractive index approximate to or substantially equal to the refractive index of the light guide. By doing so, LED-based light relieved of refraction and/or reflection at the interface between the light-transmissive charge material and the light guide. Accordingly, LED-based light is allowed to enter the light guide more favorably.

Meanwhile, the LED and the light guide may be structured integral. This structure substantially eliminates the existence of a gap between the LED and light guide. This allows LED-based light to efficiently enter the light guide.

Light diffuse reflection process is done to the backside of the light guide. The light diffuse reflection process to the backside can employ a well-known technique, such as light diffuse reflection layer formation, embossing and so on. The light diffuse reflection layer can be made by adhering a light diffuse reflection tape, applying a light diffuse reflection paint or resin, or evaporating a metal material of aluminum or the like. Of those, the light diffuse reflection layer can be preferably formed of a whitish material. For example, it is preferred to form a light diffuse reflection layer by adhering a white tape, applying a white paint or a white resin. This is because the whitish material, well balanced in light-diffusion and light-reflection effects, is to diffuse reflect the light received in a favorable manner. Meanwhile, when observing obliquely the mark in the light during daytime, the light diffuse reflection layer can be seen in the light guide side surface through the light guide. For this reason, the use of a light diffuse reflection layer formed of whitish material gives good look and enhanced luxuriousness.

Meanwhile, the light diffuse reflection tape may use a double-sided tape diffuse reflective of light, as its kind. By applying a light diffuse reflection double-sided tape at its one surface onto a light guide, a light diffuse reflection layer can be formed. Simultaneously therewith, the light guide can be fixed by the other surface of light diffuse reflection double-sided tape to a mount part.

Meanwhile, the light diffuse reflection paint can use, for example, a white paint or a fluorescent paint as its kind. Meanwhile, the light diffuse reflection resin can employ, for example, a synthetic resin, such as acryl resin, polyethylene terephthalate (PET), polycarbonate resin, silicone resin or epoxy resin, containing a light diffuse reflection agent, as its kind. The light diffuse reflection agent can use silica, titanium oxide or the like or glass having a predetermined particle size, metal such as aluminum, resin different in light refractive index from the light guide.

In the invention, the light guide provides a light emitting surface at the side surface thereof. Light diffusion process is preferably done to the side surface of the light guide. This enhances light diffusion at the side surface of light guide and makes uniform the brightness of emission light at the side surface. Furthermore, the efficiency of light extraction is improved at the side surface of light guide. The light diffusion process is not especially limited but can employ a well-known technique, such as embossing or blast process. In addition to or in place of the light diffusion process to the side surface of light guide, grooves may be provided in the backside of light guide to enhance the light diffusion at the inside of the light guide. Groove form can be decided in consideration of mark body form in a manner to obtain a desired light diffusion effect, e.g. dot-like holes, V-shaped grooves having a predetermined inclination angle of surface or the like. As the concrete examples to carry out both of a light diffusion process to the side surface and groove forming in the backside of light guide, there is included a structure to applying embossing to the side surface of light guide and further forming a V-shaped groove, from the backside of the light guide, having an inclined surface at an angle to the light guide side surface in a position distant from a light source. With this structure, light reflection and diffusion takes place positively in a region distant from the light source. As a result, the light extraction efficiency is enhanced at the side surface of light guide correspondingly to the relevant region. This further makes uniform the brightness in the entire of light emission at the side surface.

The light guide may contain a fluorescent material. It is possible to properly select and use a fluorescent material for exhibiting a desired fluorescent color regardless of whether it is organic or inorganic provided that to cause fluorescence upon receiving LED-based light. The use of an organic fluorescent material can obtain a fluorescent color of light to be perceived clear. The use of an inorganic fluorescent material can obtain a fluorescent color of light to be perceived matte.

Meanwhile, by using a colored transparent light guide or forming a color-conversion layer on the upper or side surface of the light guide, LED emission color can be changed. Namely, this structure makes it possible to emit light in a color different from the LED emission color in the nature.

There is no especial limitation in the method of fixing of between the members (mark body, substrate, light guide) and in the method of fixing the light emitting device of the invention to a mount part. It is possible to employ a well-known method, such as bonding by means of a double-sided tape, screw fixing or the like. As already described, in order to fix the light guide, in case a light diffuse reflection double-sided tape is applied to the backside thereof, simultaneously effected are light diffuse reflection process to the backside of light guide and fixing the light guide to a mount part.

Meanwhile, protrusions may be formed in a rib form in the backside of light guide. Thus, the backside of light guide is divided as a region formed with protrusions and a region not formed with protrusions. The light emitting device of the invention may be attached to a mount part, such as an automotive body, by use of the rib-like protrusions. Specifically, the lib-like protrusions at their tips and the mount part, for example, are joined together by means of a double-sided tape, an adhesive or the like. Where the light emitting device is mounted in this manner, effective reflection of light is not available at the rib-like protrusion tips of light guide, thus causing light loss. On the other hand, such light loss does not occur in the region not formed with rib-like protrusions in the light guide surface. From this fact, the region not formed with rib-like protrusions is preferably increased in area in order to enhance the light reflection efficiency at the backside of light guide. On the other hand, where the region formed with rib-like protrusions is excessively small in area, there is a fear that a sufficient bonding force is not to be obtained with the mount part. Taking the above into account, it is preferred to provide a region formed with lib-like protrusions (protrusions-formed region) smaller in area than a region not formed with lib-like protrusions (no-protrusions-formed region) in the backside of light guide. The protrusions-formed region is preferably $\frac{1}{20}$-$\frac{1}{2}$ of the no-protrusions-formed region. More preferably, the protrusions-formed region is preferably $\frac{1}{20}$-$\frac{1}{3}$ of the no-protrusions-formed region. Further preferably, it is $\frac{1}{20}$ -$\frac{1}{5}$.

The plurality of rib-like protrusions are preferably formed throughout the backside of the light guide. This is because the light guide, when attached to the mount part by utilization of the tips of rib-like protrusions, enables to bond the light guide entirety at a high bonding force.

The protrusion is not especially limited in form but can be made in a cross-sectional form of square, arch, corrugated or zigzag, for example. Incidentally, the cross-sectional form of the protrusion must not be constant in height direction thereof. For example, the protrusion may be provided tapered toward the tip.

Meanwhile, the height of the protrusion also is not especially limited. All the protrusions must not be made equal in height. For example, the protrusions may be adjusted in height to meet the form of their opposite of attachment, thus being structured to obtain a good joining force. Incidentally, the number of protrusions is not especially limited.

Figure 7:
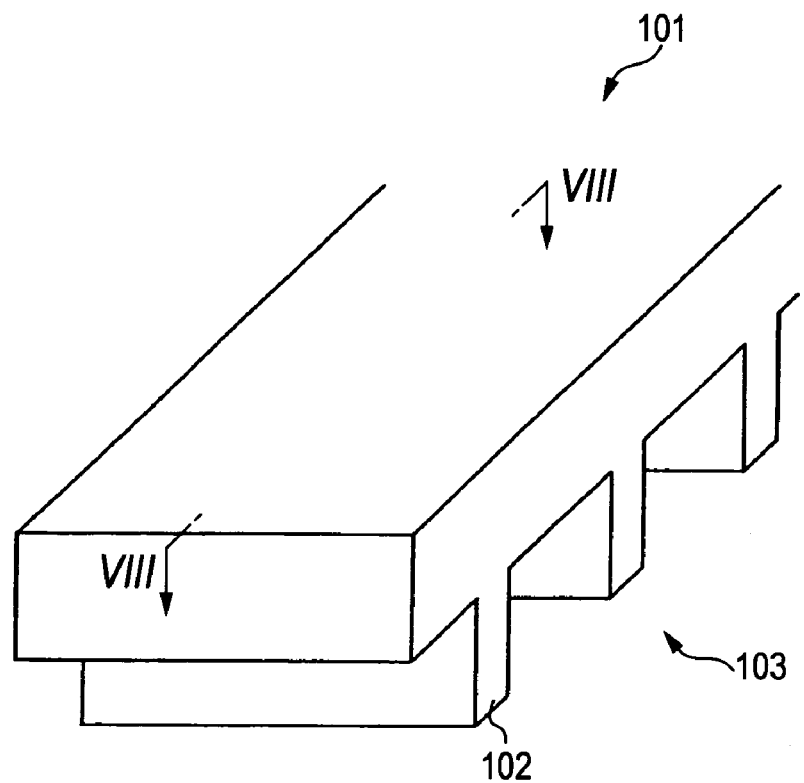
FIG. 7 is a perspective view example of the light guide 101.
Figure 8:
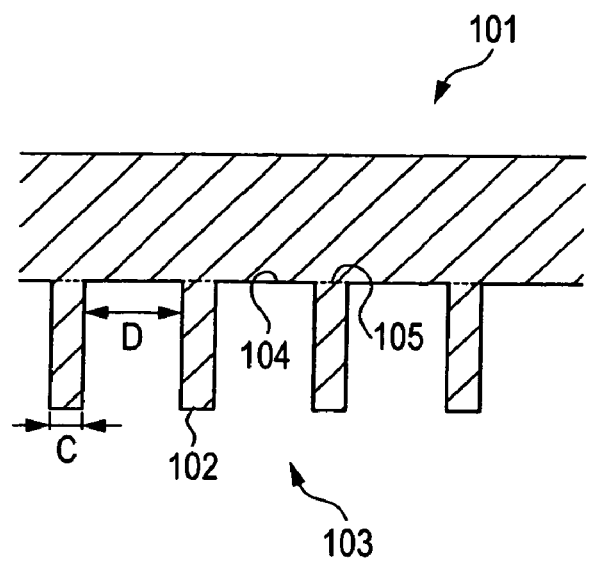
FIG. 8 is a vertical cross-sectional view of the light guide 101 taken along line VIII-VIII in FIG. 7.

The structure of the light guide is explained further while referring the drawings. FIG. 7 is a perspective view showing an example of light guide in the embodiment. FIG. 8 is a vertical cross-sectional view taken along line VIII-VIII in FIG. 7. As shown in the figure, a light guide 101 has, in its backside, protrusions 102 formed at an equal interval in a rib form in a direction along an outer edge thereof. The distance D between protrusions 102 is greater than (e.g. about 3 times) a thickness C of the protrusion. In this light guide 101, the region 105 where the protrusions 102 are formed has a total area (i.e. sum of tip-face areas of protrusions 102) smaller than the total area of the region 104 where no protrusions are formed. The light loss due to the protrusions is reduced by increasing the area of the no-protrusions-formed region.

Figure 9:
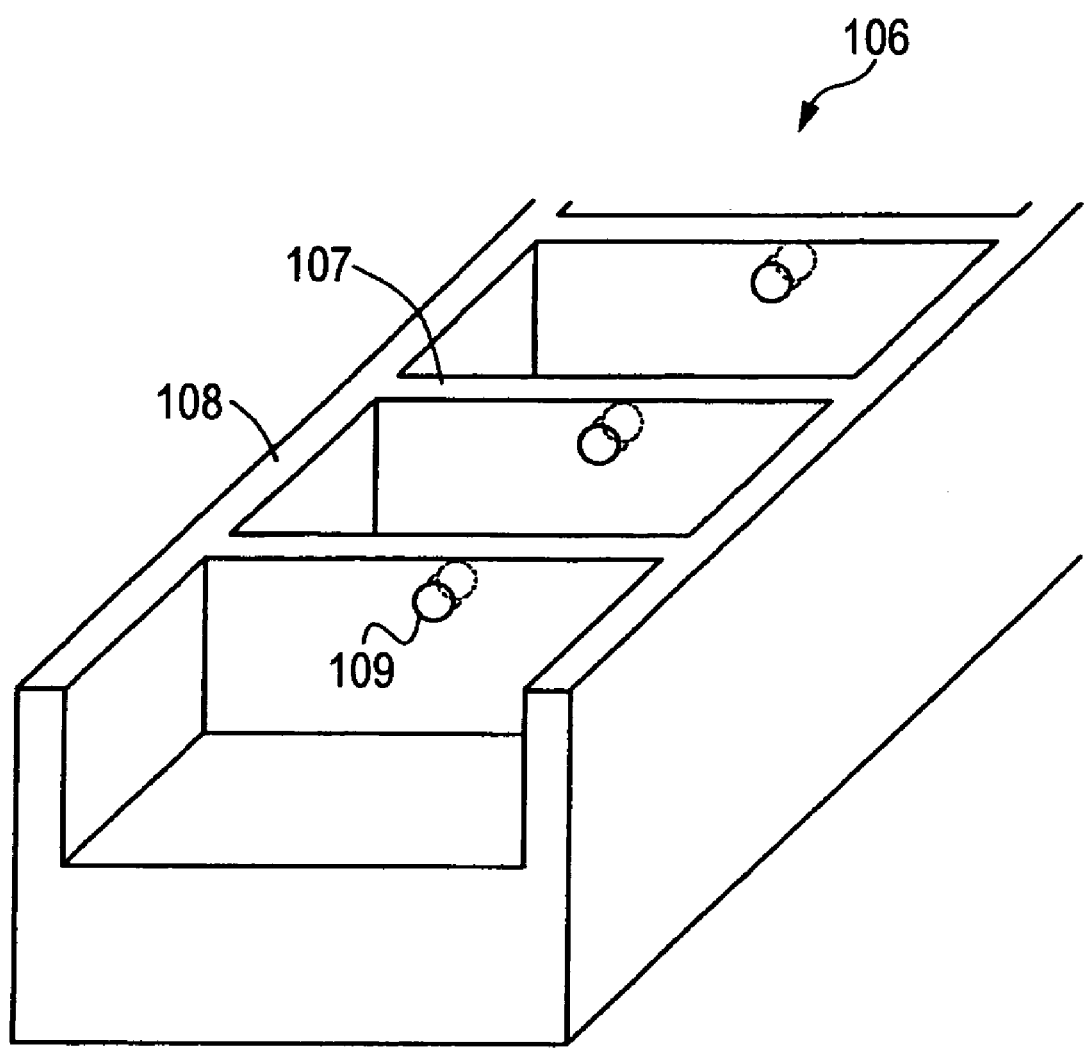
FIG. 9 is another perspective view example of the light guide 101 as viewed from the back.

FIG. 9 shows another example of light guide. In this example of light guide 106, a second protrusion 108 is formed continuous along the outer edge of the light guide 106 in a manner integral with the rib-like protrusions 107. The lib-like protrusion in this example has through-holes 109. The spaces surrounded by the rib-like protrusions and second protrusion 108 are communicated by means of the through-holes 109. In case through-holes are provided in the opposite of attachment not to prevent against closure of the spaces when the light guide 106 is attached to a vehicle body or the like, there is a reduced fear that the light guide 106 be detached from the opposite of attachment due to gas expansion within the spaces. Also, water vapor is prevented from being generated within the spaces. This can suppress the reflection from lowering at the backside of light guide (no-protrusions-formed region).

There is no especial limitation in the method of attaching or fixing the light guide to the opposite of attachment, such as a vehicle body. For example, double-sided tape, an adhesive or the like can be used. In the invention, by forming rib-like protrusions in the backside of light guide, light reflection is caused by use of the surfaces provided between the protrusions. This makes it possible to avoid the reflection upon the surface of the double-sided tape, etc.

Using embodiments, the present invention will now be explained below in greater detail.

First Embodiment

Figure 2:
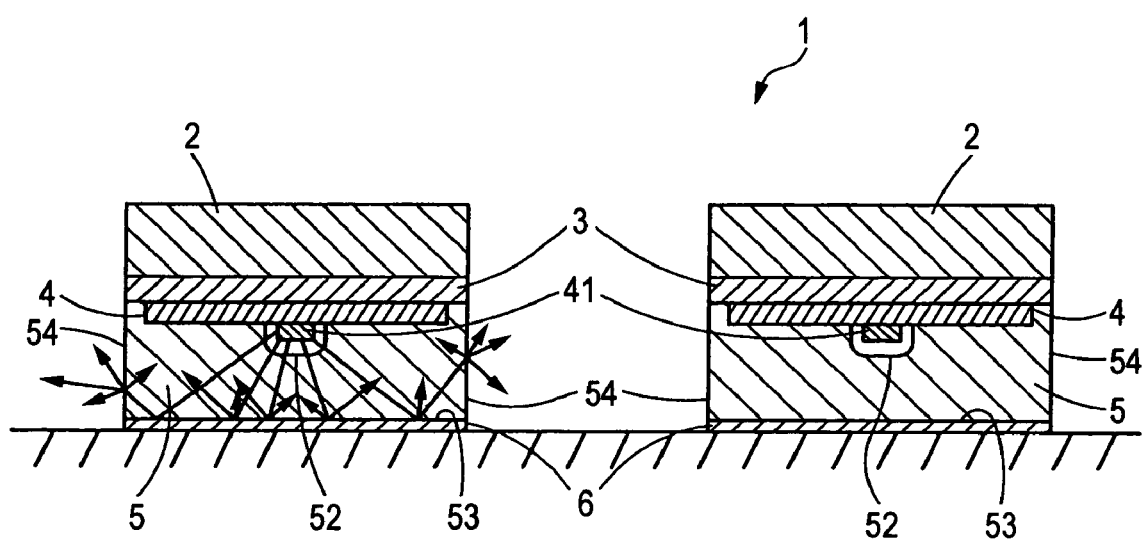
FIG. 2 is a vertical cross-sectional view the light emitting device 1 taken along line II-II in FIG. 1.
Figure 3:
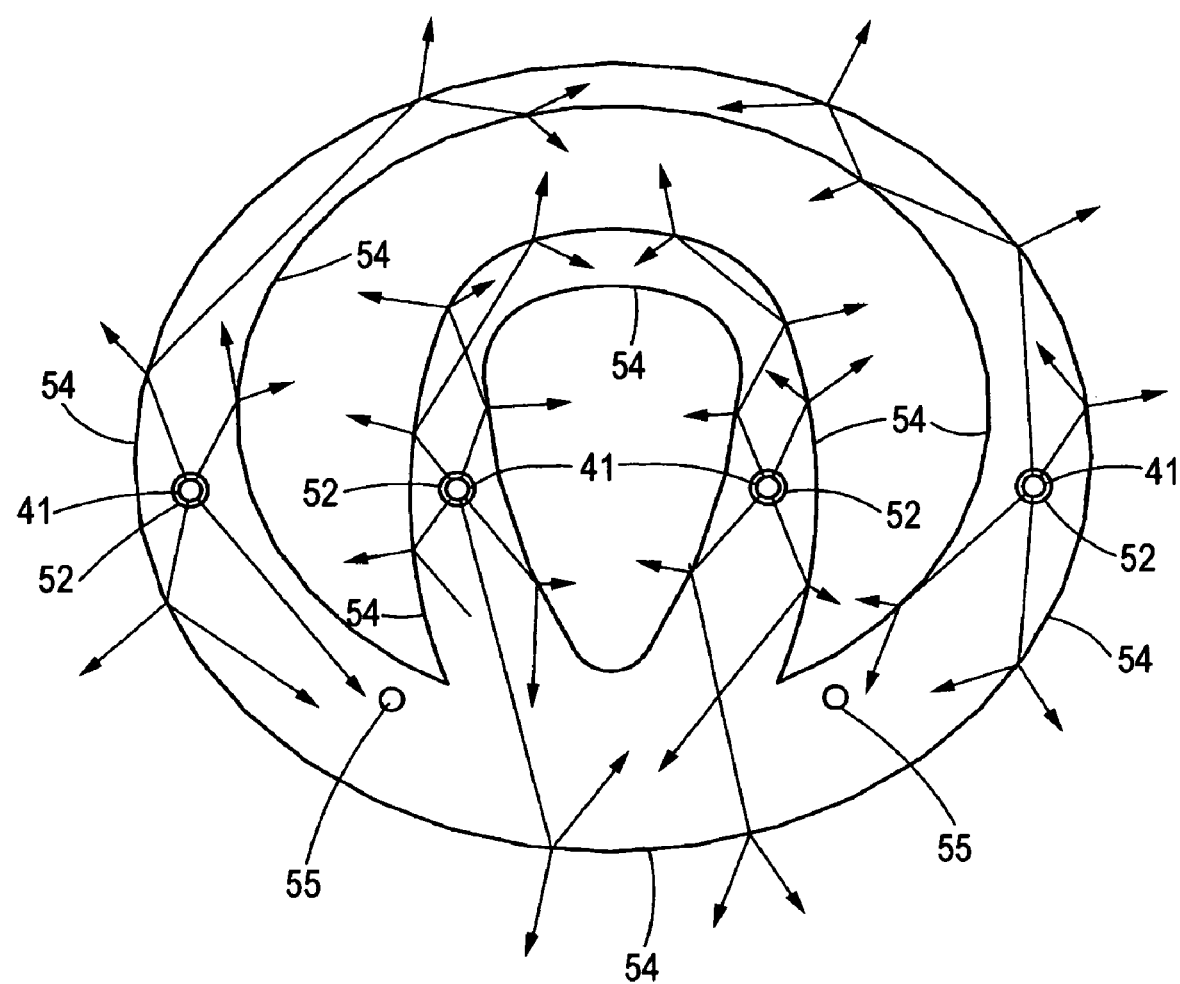
FIG. 3 is a view of a light guide plate 5 as viewed from above.

In FIG. 1 is shown an exploded perspective view of an emblem light emitting device 1 in a first embodiment of the invention. In FIG. 2 is shown a vertical cross-sectional view taken along line II-II of the emblem light emitting device 1 in FIG. 1. In FIG. 3 is shown a view of a light guide plate 5 as viewed from above. The emblem light emitting device 1 is to be attached to a vehicle body at a rear thereof (e.g. on a trunk lid). As shown in FIG. 1, the emblem light emitting device 1 is arranged with a cover 3, a substrate 4 and a light guide plate (light guide) 5 in this order in back of the mark body 2. Incidentally, numeral 4 is a white double-sided tape.

The mark body 2 is in a plan form having two ellipses different in size are fused together in a part thereof. The mark body 2, of ABS resin, has an observation surface (surface) covered with plating. The substrate 4 has a plan form analogous to and somewhat smaller than the lower half in plan form of the mark body 2. The substrate 4 is mounted with four LEDs 41 on an opposite surface to the mark body 2, in regions close to the upper ends of the four protrusions. The LEDs 41 are white-light LEDs of the SMD type (surface mounted type) which are electrically connected to a light source (not shown) of vehicle sidelights through the wiring pattern (not shown) on the substrate 4.

The light guide plate 5 has a plan form substantially the same as the plan form of the mark body 2 (see FIG. 1). The light guide plate 5 has recessed portions 51, 52 in the upper surface thereof. The recessed portion 51 is formed along the substrate 4 such that the substrate 4 is arranged in a form fit on the upper surface of the light guide plate 5. The recessed portion 52 is formed in the upper surface of light guide plate 5 in a position opposed to the LED 41. In this manner, two steps of recessed portions are formed in the upper surface of the light guide plate 5. When the substrate 4 is fit in the recessed portion 51, the LED 41 comes within the recessed portion 52. In this manner, the LED 41 is wrapped up (included) by the light guide plate 5. Meanwhile, embossing has been done to the side surface 54 of the light guide plate 5.

Meanwhile, the cover 3 is substantially the same in form as the lower half in plan form of the light guide plate 5 (see FIG. 1). The cover 3 is arranged in a manner covering the substrate 4 fit on the light guide plate 5. Meanwhile, a white double-sided tape 6 has a form substantially the same as the plan form of the light guide plate 5. The white tape 6 is applied to substantially the entire surface of the backside 53, and to an automotive body at the same time. Due to this, the light guide plate 5 is fixed on the body. Furthermore, the cover 3, the substrate 4 and the light guide plate 5 are fixed to the body by screws 7 through screw holes 31, 42, 55. Thereafter, the mark body 2 is fixed to the cover 3 by a double-sided tape.

Now explained is a light-emission mode of the emblem light emitting device 1. At first, the LED 41 emits light in association with turning-on of the vehicle sidelight. As shown in FIG. 2, the light based on the LED 41 is introduced from a surface of the recessed portion 52 of the light guide plate 5 to the inside of the light guide plate 5, and ultimately released to the outside through the side surface 54 of the light guide plate 5. A white double-sided tape 6 is applied on the entire backside 53 of the light guide plate 5. Accordingly, the backside 53 diffuse reflects the reception light and into the light guide plate 5 prevents the light from leaking at the backside 53 (see FIG. 2). Furthermore, because embossing has been done to the side surface 54 of the light guide plate 5, the reception light is diffusively emitted to the outside and diffuse reflected inward of the light guide plate 5 (see FIG. 3). Accordingly, by virtue of the backside 53 and side surface 54 of the light guide plate 5, the LED 41 light entered the light guide plate 5 efficiently travels in the light guide plate 5, thus being distributed uniform within the light guide plate 5. Bright uniform light is emitted efficiently with less irregular brightness through the side surface 54. Part of the light emitted at the side surface 54 is emitted to the automotive body of the emblem light emitting device 1. This provides indirect illumination to the mark body. As described above, in the emblem light emitting device 1, the mark body 2 is to be illuminated indirectly by the light, bright and reduced in irregular brightness, emitted through the side surface 54 of the light guide plate 5 positioned in the rear. This provides a light emitting mode that is highly designed and fully luxurious. Moreover, provided is a light-emission mode that a stereoscopic effect is unexpectedly obtainable as if the mark stands out in the dark. In addition, the emblem light emitting device 1 can be reduced in the device overall thickness because of the structure that the LED 41 is included in the light guide plate 5. Due to this, the mark is not excessively conspicuous even in the light under daylight.

Second Embodiment

Figure 4:
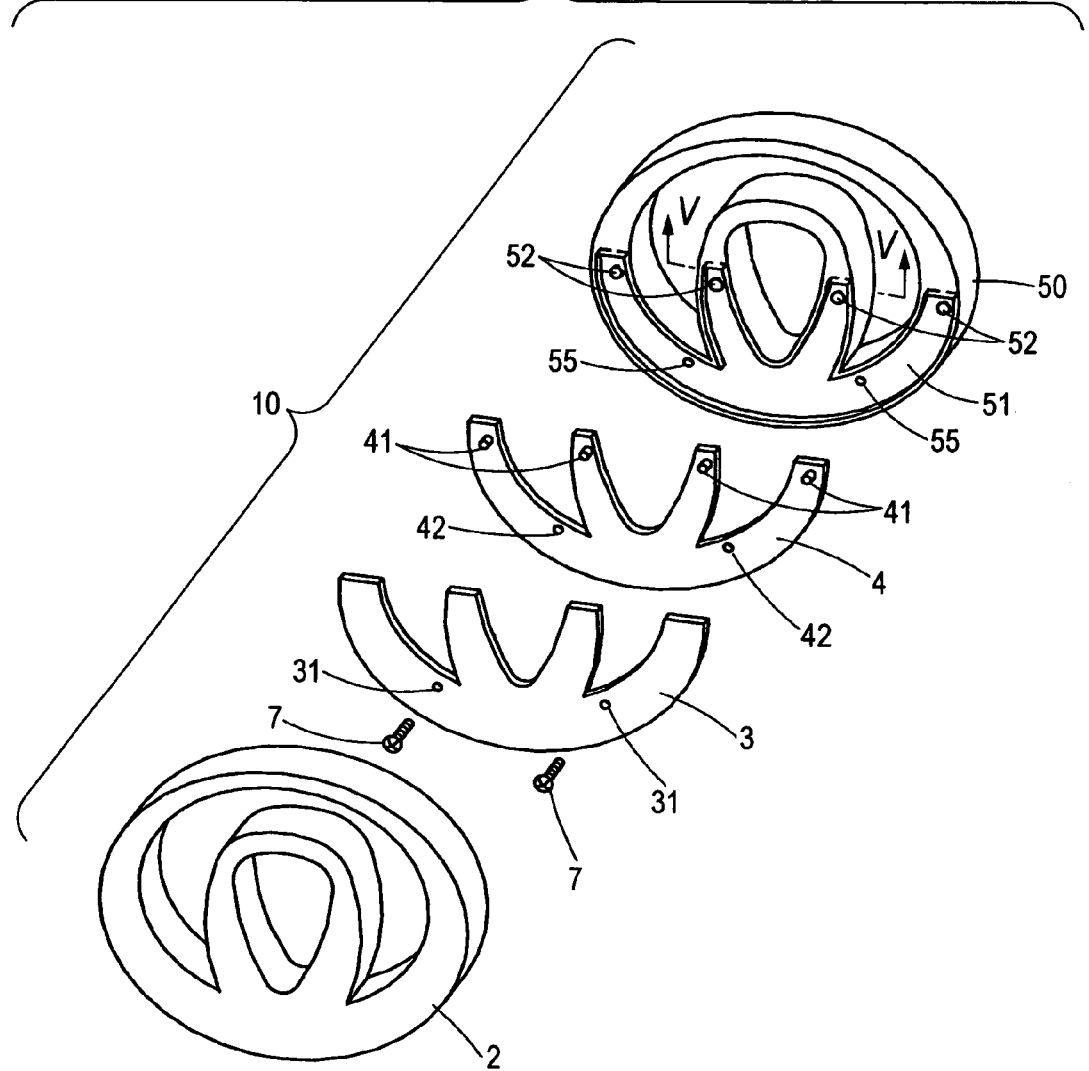
FIG. 4 is an exploded perspective view of a light emitting device 10 in a second embodiment of the invention.
Figure 5:
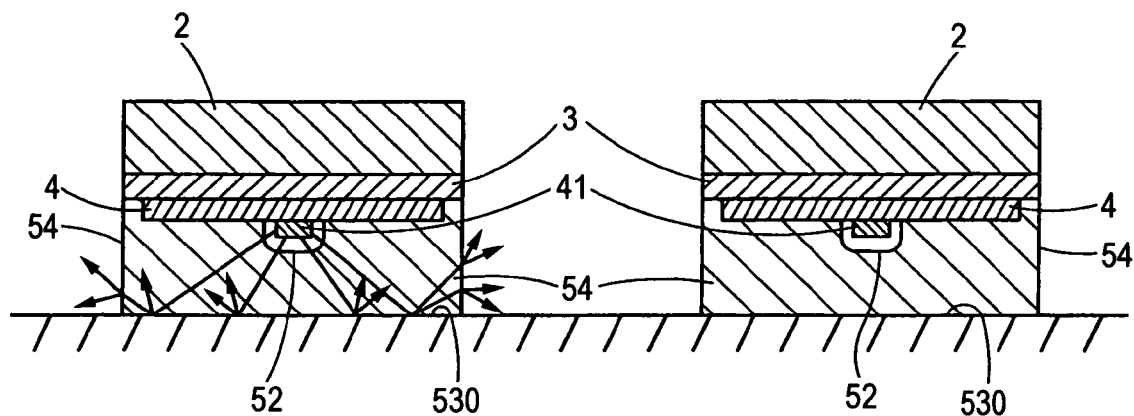
FIG. 5 is a vertical cross-sectional view of the light emitting device 10 taken along line V-V in FIG. 1.

In FIG. 4 is shown an exploded perspective view of an emblem light emitting device 10 in a second embodiment of the invention. In FIG. 5 is shown a vertical cross-sectional view taken along line V-V in FIG. 4. Incidentally, in the figures, the same members as those of the light emitting device 1 are attached with the same references, to omit the explanations thereof. In a light guide plate 50 of this embodiment, embossing has been done to a backside 530 of the light guide plate 50 of this embodiment. In the emblem light emitting device 10 having the light guide plate 50, the LED 41 light entered the light guide plate 50 is diffuse reflected by the embossed backside 530.

Accordingly, because the backside 530 provides the equivalent effect to the backside 53 of emblem light emitting device 1 applied with the white double-sided tape 6, the emblem light emitting device 10 can obtain the similar light-emission mode to the emblem light emitting device 1.

Figure 6:
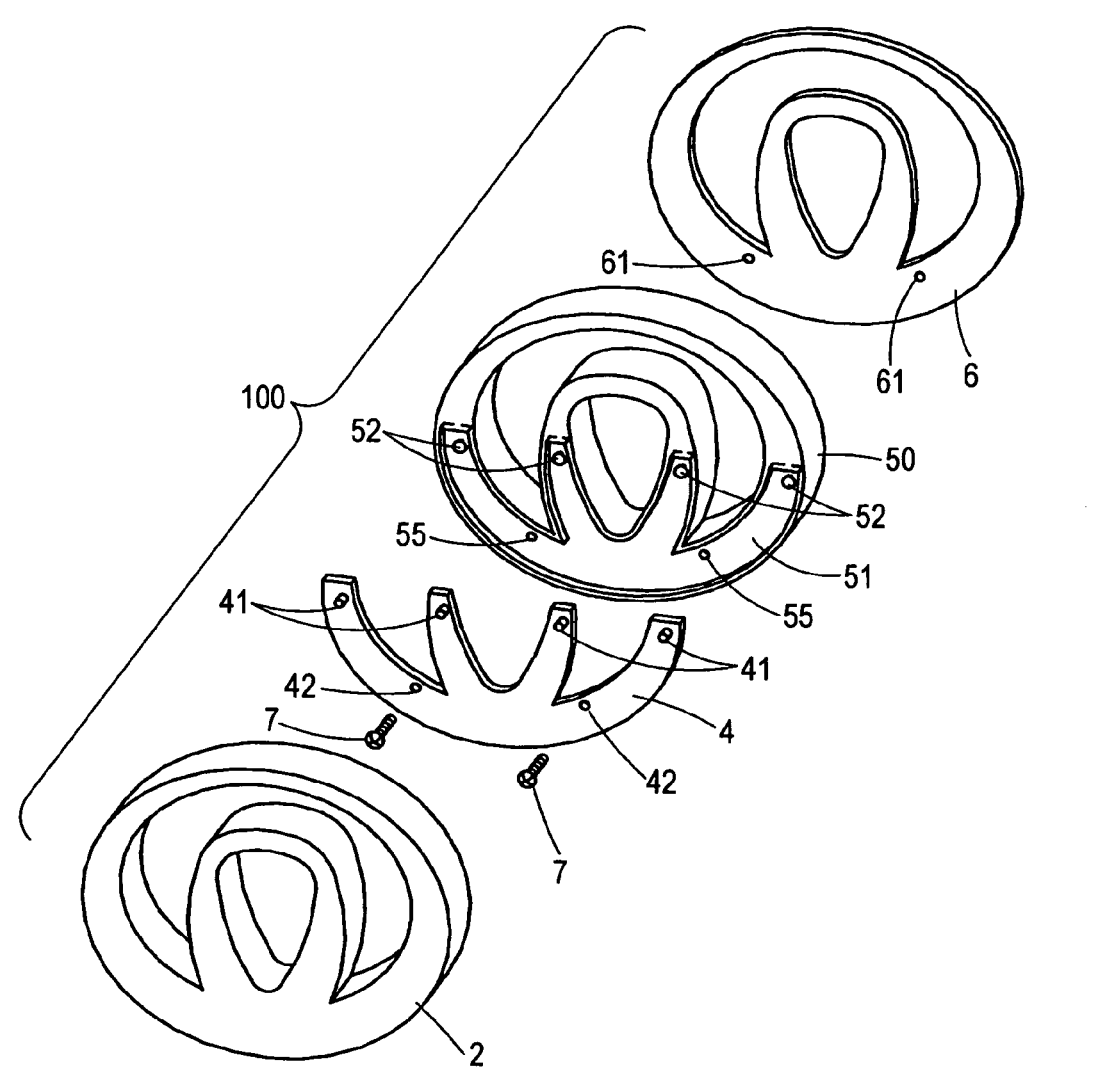
FIG. 6 is an exploded perspective view of a light emitting device 100 in another embodiment of the invention.

Although the cover 3 was used in the emblem light emitting device 1 and 10, the cover 3 may be omitted of use as shown in FIG. 6. In the emblem light emitting device 100 of this example, light-emission mode can be obtained similar to the emblem light emitting device 1 and 10.

Third Embodiment

Figure 10:
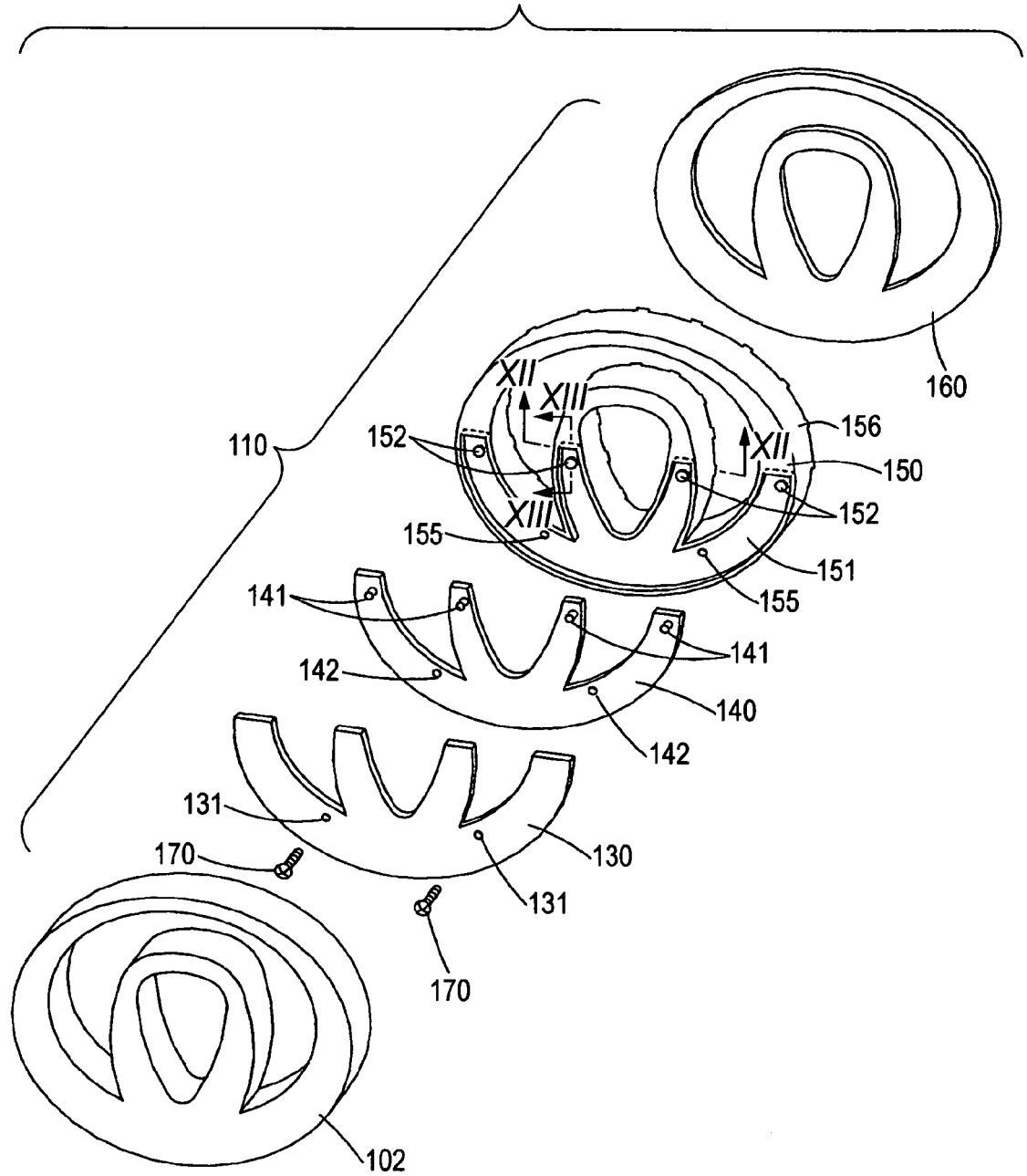
FIG. 10 is an exploded perspective view of an emblem light emitting device 110 in a third embodiment.

In FIG. 10 is shown an exploded perspective view of an emblem light emitting device 110 in a third embodiment of the invention. The emblem light emitting device 110 is to be attached to a body rear of a vehicle (e.g. on a trunk lid). As shown in FIG. 10, the emblem light emitting device 110 is arranged with a cover 130, a substrate 140 and a light guide plate (light guide) 150 in this order in back of the mark body 2. Incidentally, numeral 160 is a double-sided tape.

The mark body 120 is in a plan form having two ellipses different in size fused together in a part thereof. The mark body 120, of ABS resin, has an observation surface (surface) covered with plating. The substrate 140 has a plan form analogous to and somewhat smaller than the lower half in plan form of the mark body 120. The substrate 140 is mounted with four LEDs 141 on an opposite surface to the mark body 120, in regions close to the upper ends of the four protrusions. The LEDs 140 are white-light LEDs of the SMD type (surface mounted type) which are electrically connected to a light source (not shown) of vehicle sidelights through the wiring pattern (not shown) on the substrate 140.

The cover 130 is in a form substantially the same as the lower half in plan form of the light guide plate 150. The cover 130 is arranged in a manner covering the substrate 140 fit on the light guide plate 150. Meanwhile, the double-sided tape 160 has a plan form substantially the same as the plan form of the light guide plate 150. The light guide plate 150 at its backside 153 and the automotive body are joined together by the double-sided tape 160. Furthermore, the cover 130, the substrate 140 and the light guide plate 150 are fixed to the body by screws 170 through screw holes 131, 142, 155. Thereafter, the mark body 120 is fixed to the cover 130.

The light guide plate 150 has a plan form substantially the same as the plan form of the mark body 120. The light guide plate 150 has two recessed portions (151, 152) in the upper surface thereof. The recessed portion 151 is formed along the substrate 140 such that the substrate 140 is arranged in a form fit on the upper surface of the light guide plate 150. The recessed portion 152 is formed in the upper surface of light guide plate 150 in a position opposed to the LED 141. In this manner, two steps of recessed portions are formed in the upper surface of light guide plate 150. When the substrate 140 is fit in the recessed portion 151, the LED 141 comes within the recessed portion 152. In this manner, the LED 141 is wrapped up (included) by the light guide plate 150. Meanwhile, embossing has been done to the side surface 156 of the light guide plate 150.

Figure 11:
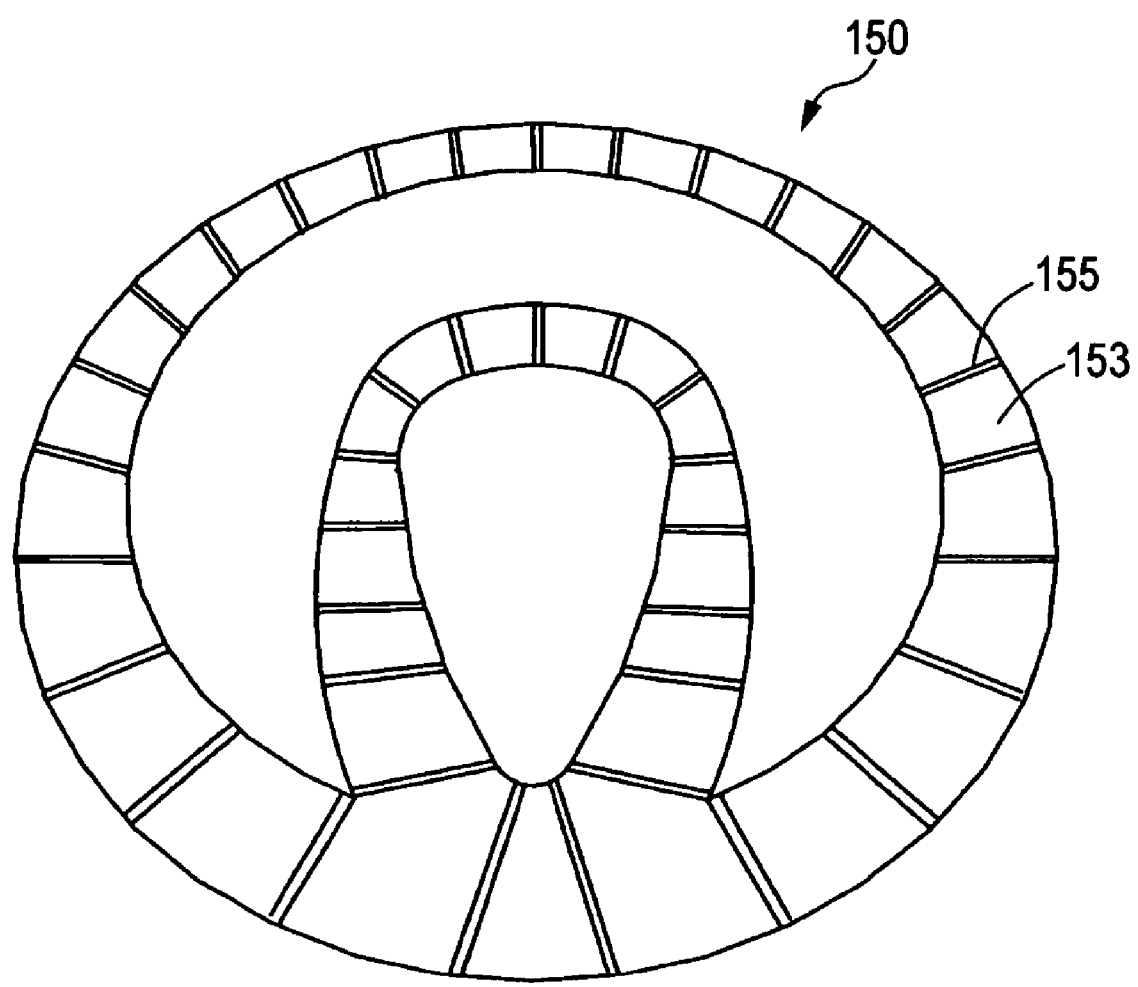
FIG. 11 is a plan view of a light guide plate 150 as viewed from the back.
Figure 12:
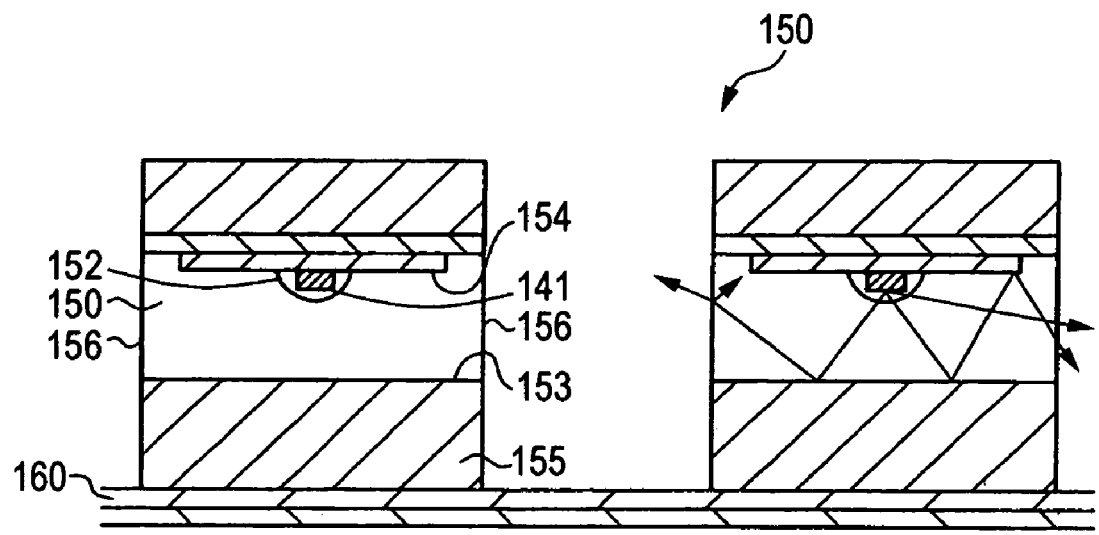
FIG. 12 is a vertical cross-sectional view taken along line XII-XII in FIG. 11.
Figure 13:
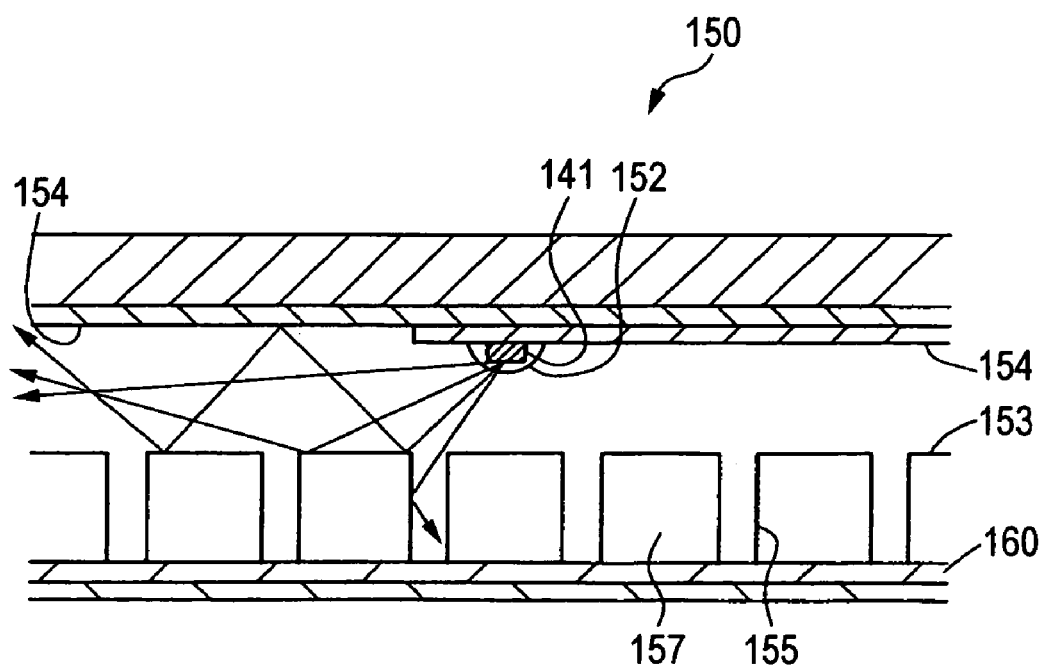
FIG. 13 is a vertical cross-sectional view taken along line XIII-XIII in FIG. 11.

FIG. 11 is a plan view of the FIG. 10 light guide plate 150 as viewed from the back thereof. FIG. 12 is a vertical cross-sectional view taken along line XII-XII in FIG. 10. FIG. 13 is a vertical cross-sectional view taken along line XIII-XIII in FIG. 10.

As shown in FIG. 11, a plurality of protrusions 155 are formed in a rib form throughout the backside of light guide plate 150. In the backside, the region 153 no protrusions are formed has the total area greater than the total area of the region protrusions 155 are formed. Here, blast process has been done to the region 153, thus enabling effective diffusion and reflection of the light introduced in the light guide plate 150. In this manner, by broadly forming a surface highly reflective and diffusive, light loss can be reduced at the backside of light guide plate and light guiding operation can be effected favorably.

The light emitting device structured as above can obtain the following light emitting mode.

As shown in FIGS. 12 and 13, the LED 141 light enters the light guide plate 150 through the surface of recessed portion 152 of light guide plate 150. Part of the light entered reaches the inside of rib-like protrusions 155 while the other part reaches the region 153 no rib-like protrusions are formed. Here, the light traveled into the lib-like protrusions 155 is reflected and diffused or absorbed at the side and end surfaces of the lib-like protrusions 155. Consequently, the light in its significant part is not to be utilized for the light emission through the light guide-plate side surface 156. Meanwhile, the light reached the region no rib protrusions are formed is efficiently reflected and absorbed in this region. Thus, the light is efficiently utilized for the emission through the light guide-plate side surface 156. In the structure of this embodiment, because the region no rib-like protrusions are formed is provided broad, high utilization ratio of light can be obtained in the region no rib-like protrusions 155 are formed while reducing the light loss in rib-like protrusions 155 noted above. Thus, light can be emitted with brightness from the light guide-plate side surface 156. Meanwhile, because embossing has been done to the side surface 156 of light guide plate 150, the light received is to be diffused to the outside and diffuse reflected inward of the light guide plate 150. Accordingly, the backside 153, upper surface 154 and side surface 156 of light guide plate 150 allows the light from the LED 140 entered the light guide plate 150 to be guided efficiently in the light guide plate 150 and distributed uniform in the light guide plate 150. From the side surface 156, light is efficiently emitted with brightness and uniformity reduced in irregular brightness. Part of the light emitted through the side surface 156 is emitted to the automotive body of the emblem light emitting device. This indirectly illuminates the mark body 120.

As described above, in the emblem light emitting device 110, the mark body 120 is to be illuminated indirectly by the bright light, less in irregular brightness, emitted through the side surface 156 of the light guide plate 150 positioned in the rear. This provides a light-emission mode that is highly designed and fully luxurious. Moreover, provided is a light-emission mode that a stereoscopic effect is unexpectedly obtainable as if the mark stands out in the night dark. In addition, the emblem light emitting device 110 can be reduced in the device overall thickness because of the structure the LEDs 141 are included in the light guide plate 150. Due to this, the mark is not excessively conspicuous even in the light under daylight.

Fourth Embodiment

Figure 14:
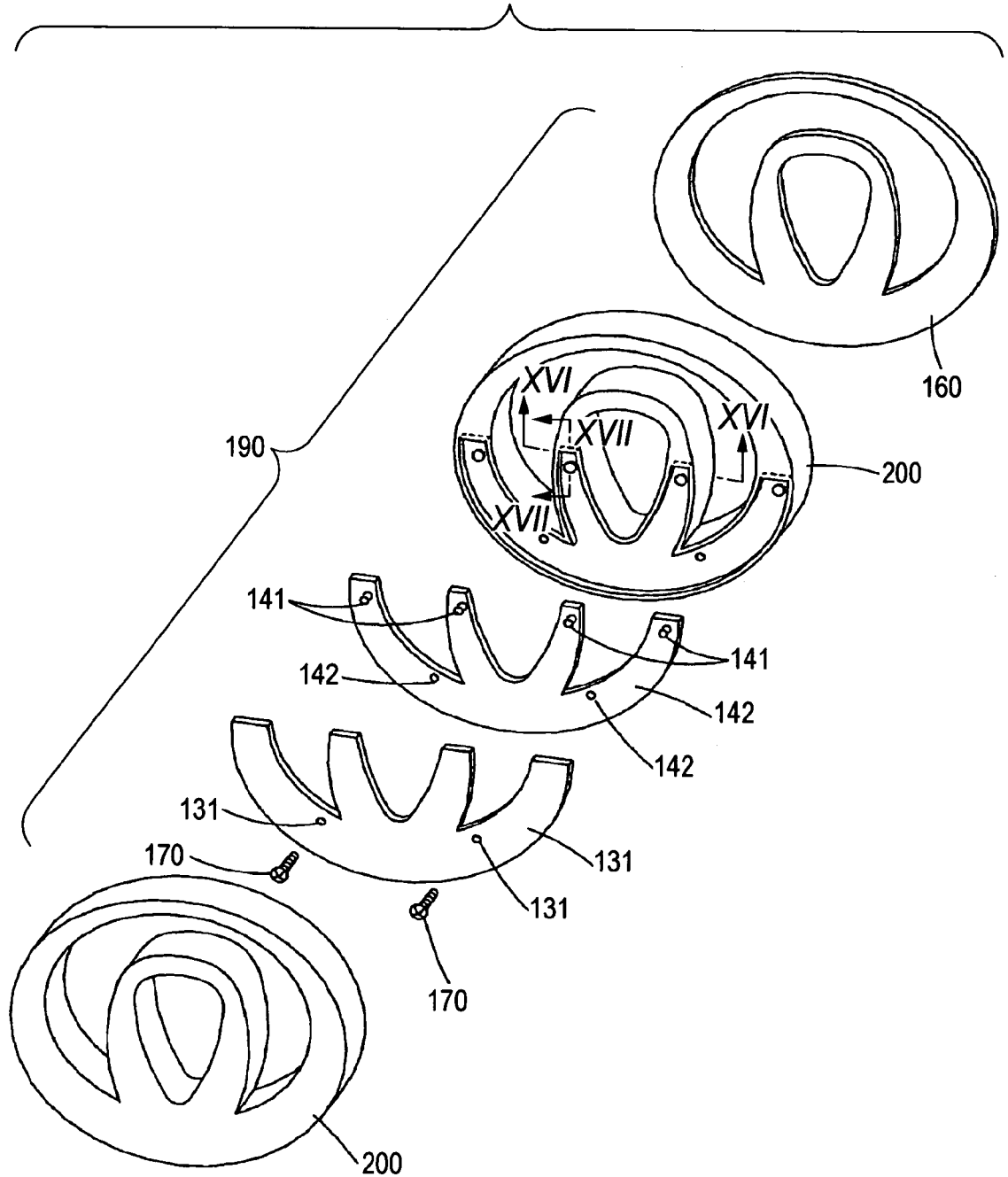
FIG. 14 is an exploded perspective view of an emblem light emitting device 190 in a fourth embodiment.

A fourth embodiment of the invention is now explained. In FIG. 14 is shown an exploded perspective view of an emblem light emitting device 190.

Figure 15:
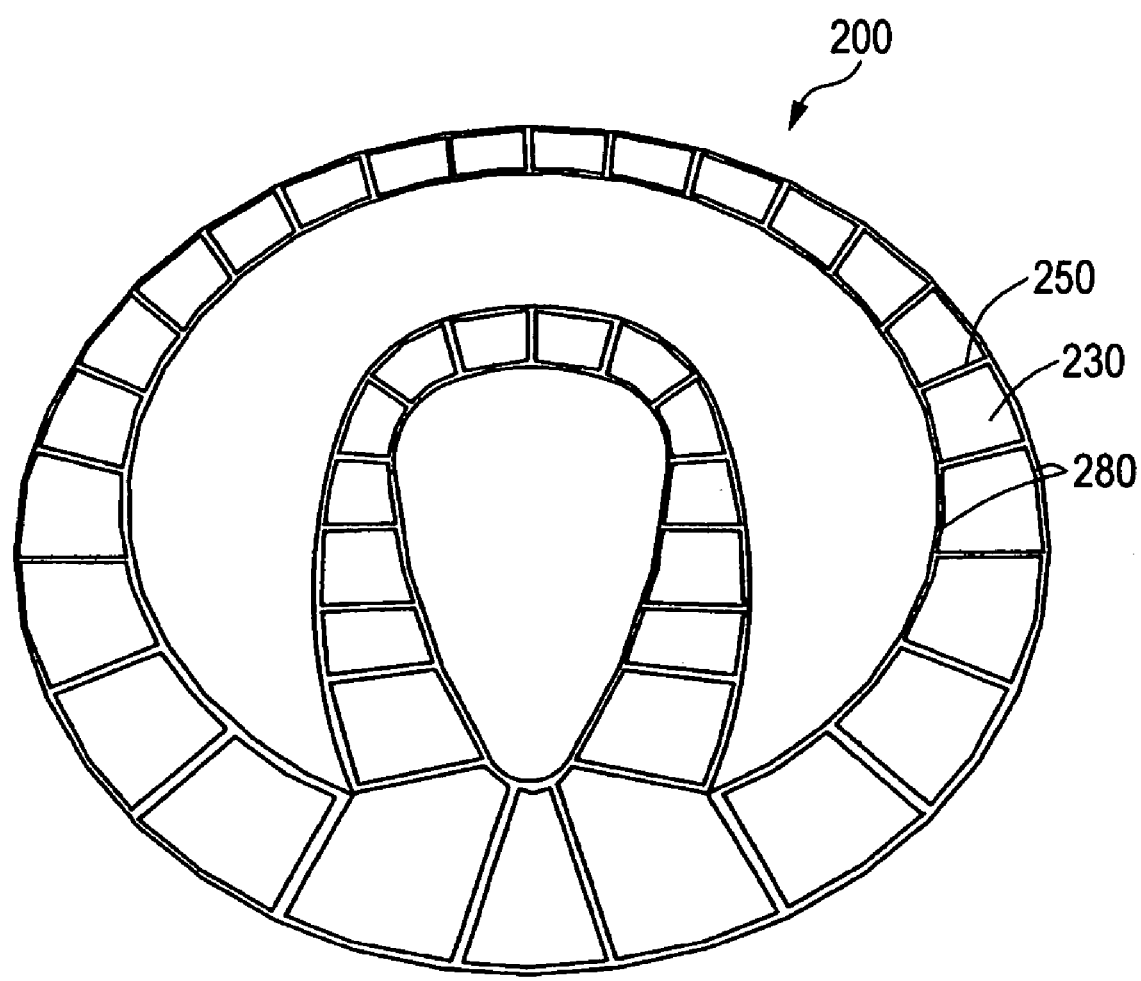
FIG. 15 is a plan view of a light guide plate 200 in FIG. 14.
Figure 16:
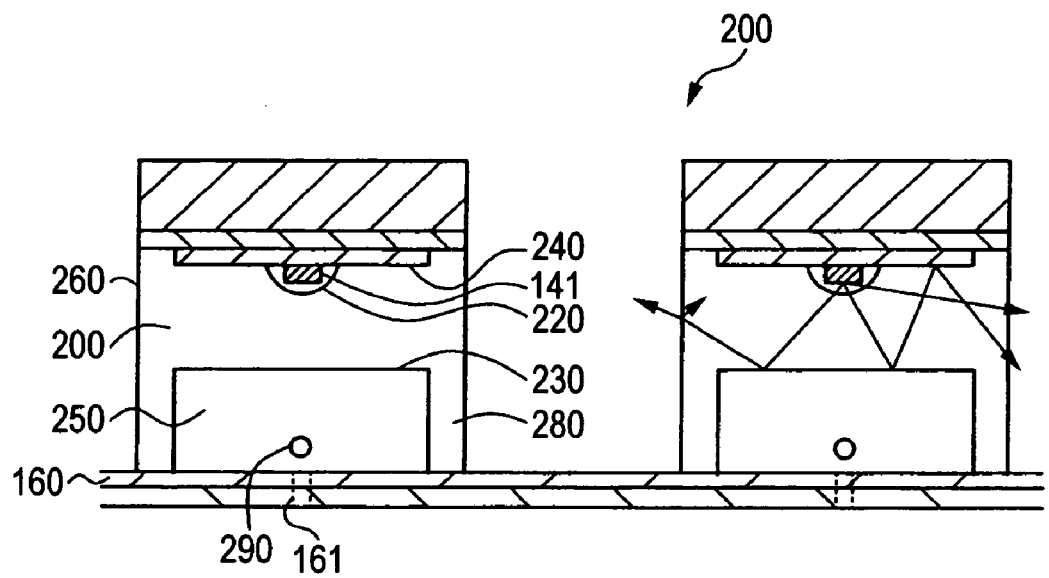
FIG. 16 is a vertical cross-sectional view taken along line XVI-XVI in FIG. 14.
Figure 17:
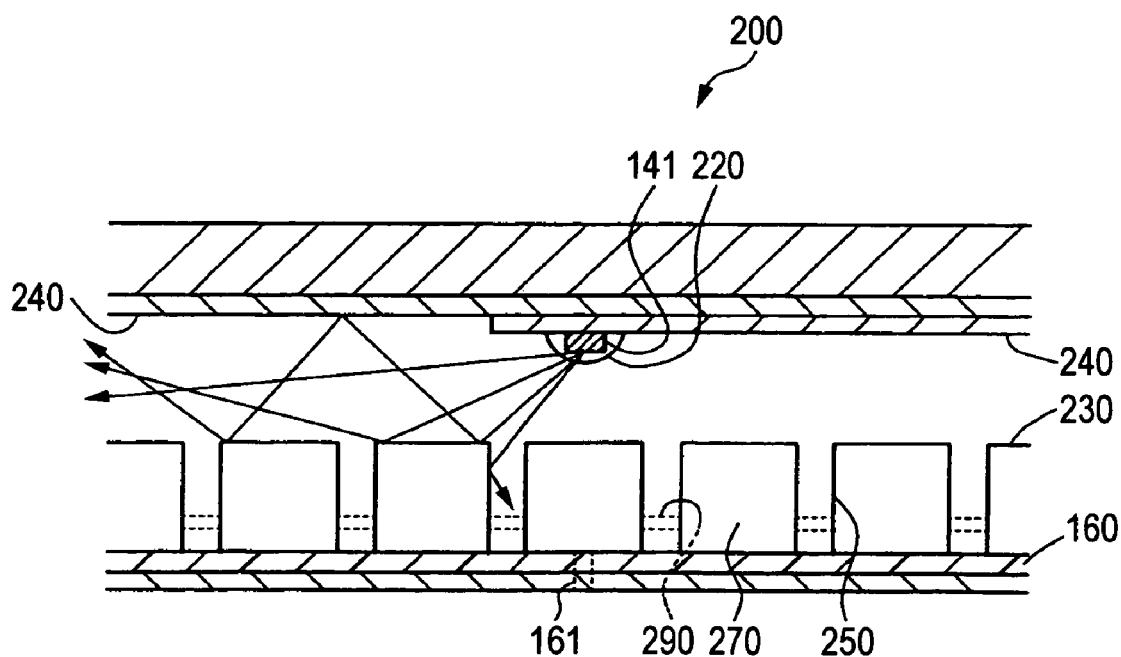
FIG. 17 is a vertical cross-sectional view taken along line XVII-XVII in FIG. 14.

FIG. 15 is a plan view of a light guide plate 200 to be used in the emblem light emitting device 190, as viewed from the back thereof. FIG. 16 shows a vertical cross-sectional view taken along line XVI-XVI in FIG. 14. FIG. 17 shows a vertical cross-sectional view taken along line XVII-XVII in FIG. 14. In this embodiment, the members same as those of the foregoing embodiment are attached with the same references, to omit the explanations thereof.

As shown in FIG. 15, a plurality of protrusions 250 are formed in a rib form along an outer edge the light guide plate 200 throughout the backside thereof. Meanwhile, the outer edge is continuously formed with protrusions 280 integrally with the protrusions 250. In the rib-formed protrusion 250, a through-hole 290 is provided in order to secure communication with other spaces. Meanwhile, in order to obtain communication with the outside, some spaces have through-holes 161 provided with the body through a double-sided tape 160. This can avoid the space 270 from expanding due to temperature rise in the exterior air. Meanwhile, in using the emblem light emitting device 190 in rainy weather, by providing the continuous protrusion 280 along the outer periphery of light guide plate, the light guide plate is prevented against flowing in of rainwater. Accordingly, the emblem light emitting device 190 is to be suitably used in rainy weather.

If not providing the through-holes 290 in the rib-like protrusions 250 and through-holes 161 to the body, the region constituted by the protrusions 250, the protrusions 280 in outer edge and the backside 230 is to form a space 270 in a closed state when the light guide plate 200 and the double-sided tape 160 are joined together. Because this space 270 is in a closed state, there is a fear that, as temperature rises, the gas confined within the space 270 expands to cause peel-off of the light guide plate 200 and double-sided tape 160.

Incidentally, in the above structure, the provision of rib-like protrusions in the light guide plate provides an effect that high utilization ratio of light is obtainable in the region no rib-like protrusions are formed while reducing the light loss at the rib-like protrusions. As a result, a light-emission mode is to be provided that is designed high with full luxuriousness as well as the third embodiment of the invention.

Fifth Embodiment

Figure 18:
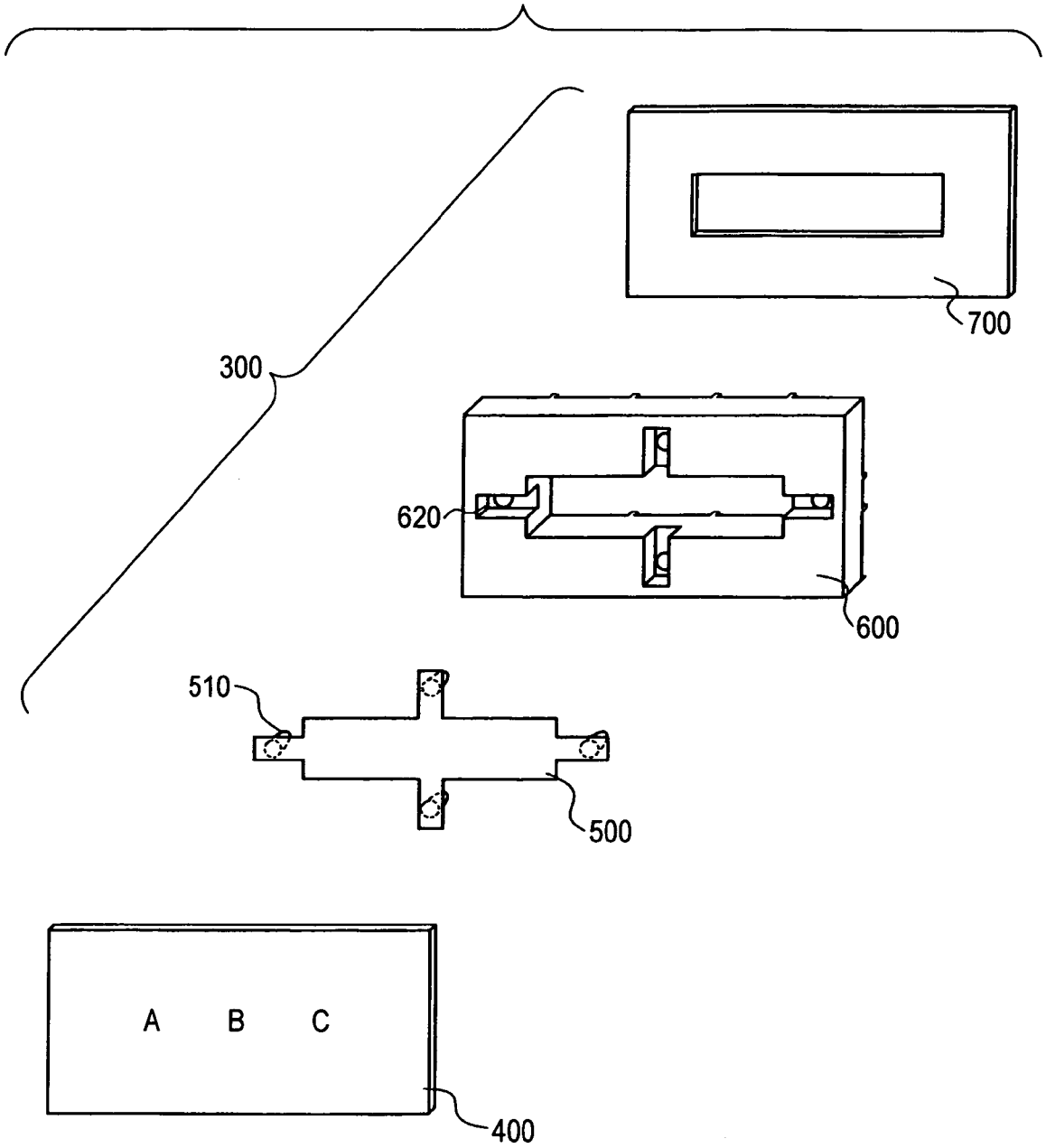
FIG. 18 is an exploded perspective view of a compact advertisement light emitting device 300 in a fifth embodiment.

A fifth embodiment of the invention is now explained. In FIG. 18 is shown an exploded perspective view of a compact advertisement light emitting device 300. The compact advertisement light emitting device 300 is arranged with a substrate 500 and a light emitting plate 600 in this order in back of a advertisement body 400, thus being fixed to the opposite of attachment by means of a double-sided tape 700. The advertisement body 400 is not especially limited in its size and material. The substrate 500 is mounted with four LEDs 510 on its surface opposite to mark body 400 in positions close to protrusion upper ends. The LEDs 510 are electrically connected to the outside through a wiring pattern on the substrate 500. The double-sided tape 700 has a plan form substantially same as the plan form of the light guide plate 600. The double-sided tape 700 connects between the light guide plate 600 at its backside and the opposite of attachment. Furthermore, the advertisement body 400, the substrate 500 and the light guide plate 600 are fixed to the opposite of attachment by predetermined means such as screws.

Now explained is the form of a protrusion 650 in the backside of the light guide plate 600. The light introduction, reflection and emission process of light on the light guide plate 600 is similar to the third embodiment, hence omitting the explanations thereof.

The light guide plate 600 is in a form of rectangular parallelpiped hollowed in the center to receive the substrate 500 in the hollow. Meanwhile, the light guide plate 600 has, in its outer periphery, recessed portions 620 for accommodating the LEDs 510 therein.

Figure 19:
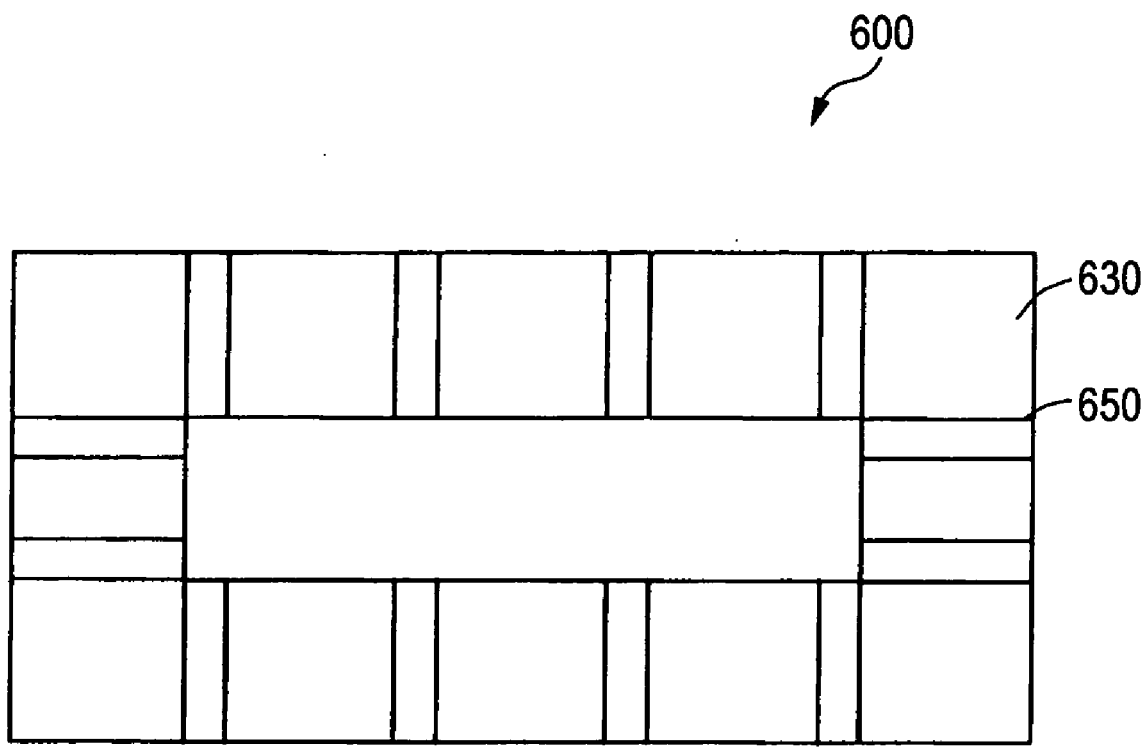
FIG. 19 is a plan view of a FIG. 18 light guide plate 600 as viewed from the back.

FIG. 19 shows a plan view of the light guide plate 600 as viewed from the back. A plurality of protrusions 650 are provided along its outer edge in a rib form throughout the backside without providing outer-edge protrusions. The outer-edge protrusions need not be provided where there is no fear of intrusion of rainwater, etc. into the light guide plate during use of the compact advertisement light emitting device 300. For this reason, the light guide plate 600 is in a form suited for indoor use of compact advertisement. Meanwhile, by eliminating the outer-edge protrusions, backside 630 area can be increased to effectively reflect and emit the light introduced. Furthermore, by eliminating the outer-edge protrusions, no closed space is caused thus enabling to avoid against space expansion due to temperature rise.

In the above structure, by providing the rib-like protrusions in the light guide plate, offered is an effect that high utilization efficiency of light is obtained in the region no rib-like protrusions are formed while reducing light loss at the rib-like protrusions. As a result, a light-emission mode is to be provided that is designed high with full luxuriousness as well as the other embodiments of the invention.

The invention is never limited to the foregoing embodiments and examples. Various modifications are also included in the invention, within the range not departing from the claims but to be easily reached by the person ordinarily skilled in the art.

The light emitting device of the invention is applicable not only to automotive emblems but also to those of marks to be provided on PCs (personal computers), cellular phones, etc.

Meanwhile, the light guide plate in the invention can be applied in various ways, e.g. compact advertisement, besides the use for vehicle emblem illuminations.

What is claimed is:

1. A light emitting device comprising:
   a mark body;
   a substrate, a first surface of which the mark body is arranged;
   a light emitting diode (LED) mounted on a second surface of the substrate; and
   a light guide arranged on the second surface of the substrate, including a first surface for introducing a light emitted from the LED, a second surface for emitting the light and a third surface opposing the first surface on which a light is reflected in a diffused manner,
   wherein the third surface of the light guide comprises a plurality of protrusions in a rib form and the plurality of protrusions are formed such that the protrusions are arranged substantially at an equal interval in a direction along the outer edge of the light guide.

2. The light emitting device according to claim 1, wherein the third surface of the light guide comprises a light diffuse reflection surface.

3. The light emitting device according to claim 1, wherein the light guide has a plan form analogous to a plan form of the mark body.

4. The light emitting device according to claim 1, wherein the light guide has a plan form substantially the same as a plan form of the mark body.

5. The light emitting device according to claim 1, wherein a light diffuse reflection layer is formed on the third surface of the light guide.

6. The light emitting device according to claim 1, wherein the third surface of the light guide is embossed.

7. The light emitting device according to claim 1, wherein the light guide includes a recess to receive the LED.

8. The light emitting device according to claim 1, wherein the light guide has a second protrusion continuing along an outer edge thereof, the second protrusion being formed integral with the plurality of protrusions.

9. The light emitting device according to claim 1, wherein, in the third surface of the light guide, a region where the plurality of protrusions are formed has a total area smaller than a total area of a region where the plurality of protrusions are not formed.

10. The light emitting device according to claim 1, wherein the plurality of protrusions are formed throughout the third surface of the light guide.

11. The light emitting device according to claim 9, wherein blast process is subjected to the region where the plurality of protrusions are not formed.

12. A light emitting device comprising:
a mark body;
a substrate arranged in back of the mark body;
a light emitting diode (LED) mounted on an opposite surface of the substrate to the mark body;
a light guide arranged on a closer side of the substrate to the LED and having an upper surface serving as a light introducing surface for introducing LED-based light, a side surface serving as a light emitting surface and a backside having a plurality of protrusions in a rib form, wherein the plurality of protrusions are formed such that the protrusions are arranged substantially at an equal interval in a direction along the outer edge of the light guide.

13. The light emitting device according to claim 12, wherein the light guide has a second protrusion continuing along an outer edge thereof, the second protrusion being formed integral with the plurality of protrusions.

14. The light emitting device according to claim 12, wherein, in the backside of the light guide, a region where the plurality of protrusions are formed has a total area smaller than a total area of a region where the plurality of protrusions are not formed.

15. The light emitting device according to claim 12, wherein the plurality of protrusions are formed throughout the backside of the light guide.

* * * * *